S. G. SIMONS.
NUTCRACKER.
APPLICATION FILED SEPT. 20, 1920.
1,388,071.
Patented Aug. 16, 1921.
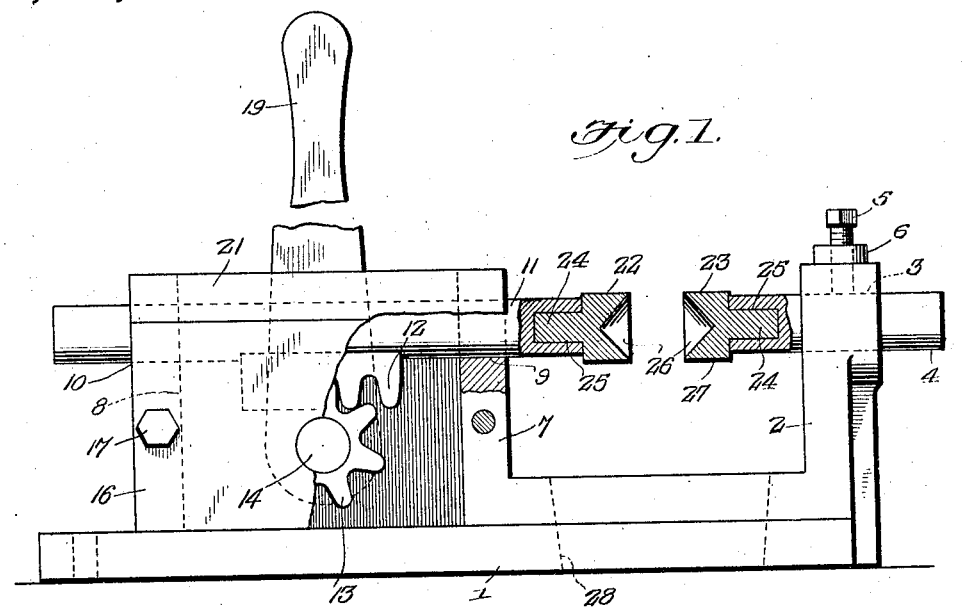
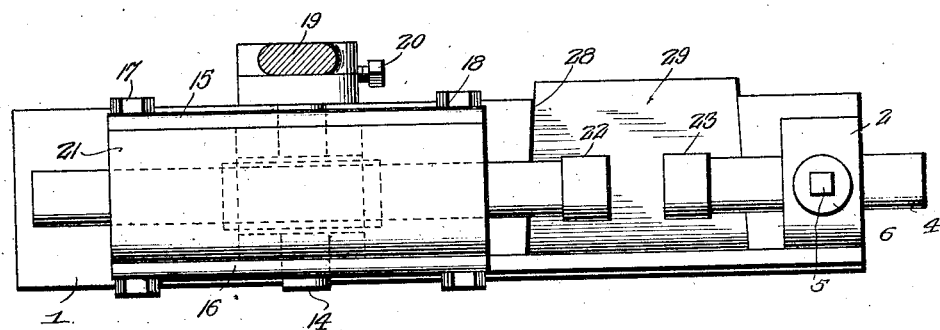
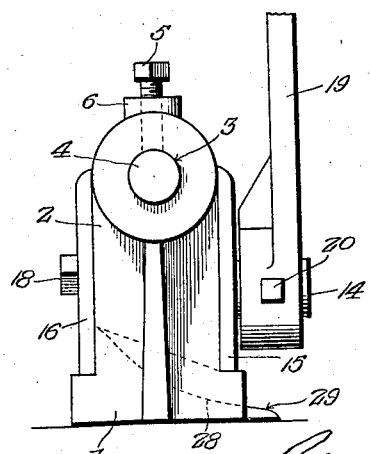
INVENTOR.
S.G. Simons,
BY
Geo. F. Kimmel
ATTORNEYS.

UNITED STATES PATENT OFFICE.

SIDNEY G. SIMONS, OF COLUMBUS, GEORGIA.

NUTCRACKER.

1,388,071. Specification of Letters Patent. Patented Aug. 16, 1921.

Application filed September 20, 1920. Serial No. 411,365.

*To all whom it may concern:*

Be it known that I, SIDNEY G. SIMONS, a citizen of the United States, residing at Columbus, in the county of Muscogee and State of Georgia, have invented certain new and useful Improvements in Nutcrackers, of which the following is a specification.

This invention relates to nut crackers and more specifically is directed to that type of device whereby various sizes and different varieties of nuts may be cracked without breaking the kernel.

One of the objects of my invention is the provision of a novel and improved adjustable nut cracker having removable dies to accommodate various size nuts to prevent the kernels from being broken when the nut is cracked.

Another and important object of my novel nut cracker resides in the provision of an integral chute with the frame or base plate of the cracker, for directing the kernels and shells to a hopper or separator after the nuts are cracked.

A still further object of my invention relates to an adjustable, die support or holder for various sizes and varieties of nuts, whereby unnecessary pressure is overcome in cracking the nuts.

With these objects in view and others which will be manifest and suggested as the nature and purpose of my invention are revealed in the following specification and drawing wherein I have shown a practical, yet preferred embodiment thereof.

Figure 1 is a side elevation, with parts broken away.

Fig. 2 is an end view.

Fig. 3 is a plan.

Similar numerals in the specification referring to corresponding parts on the drawing, 1 designates a flat base provided with an integral end support 2 apertured at 3 for receiving a short, rod 4 held in various longitudinal, adjustable positions by a vertical set screw 5 in the boss 6 of said end support.

Longitudinally spaced, vertical supports 7, 8 apertured as at 9, 10 in alinement with the support 2 receive a longitudinal plunger 11 having teeth 12 formed integral therewith and intermediate of its ends for engagement with the rotatable gear 13 on the transverse shaft 14, rotatably supported in the apertured side plates 15, 16 which are securely bolted together as at 17, 18. A handle 19 secured by a set screw 20 to the transverse shaft is adapted to operate the plunger 11, a curved plate 21 inclosing the gearing, protecting the operator and preventing the said gearing from being clogged with dust or refuse.

Removable dies 22, 23 having reduced ends 24 are seated within the forward apertures 25 of the rod and plunger, the said dies having beveled, cone-shaped grooves 26 in their enlarged portions 27 for receiving the nuts to be cracked.

The base of the nut cracker between the end support 2 and the support 7 is preferably cut away as at 28 to provide a downwardly extending chute 29 whereby the nuts will fall to a hopper or separator (not shown) below the nut cracker.

By adjusting the longitudinal rod 4 it will be seen that the degree of pressure necessary to be exerted by operating the handle 19 may be regulated and thus the nuts may be cracked without breaking the kernel, it being understood that the shells of various kinds of nuts may be broken more easily than others. The interchangeable dies 22, 23 may of course, be removed and other dies inserted in their place to more effectively open different kinds of nuts, as desired. When broken, the kernels and shells fall below to the chute 28 into the receptacle as will be obvious from Fig. 2.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

In a nut cracker of the class described, a base, an integral end support, an adjustable fixed rod carried thereby, spaced vertical supports and side plates also carried by said base, a longitudinally movable plunger carried by said spaced supports in direct alinement with said rod, teeth formed integral with said plunger and intermediate thereof, a transverse shaft supported by the side plates, a toothed gear rotatable with said shaft meshing with the teeth of said plunger, a manually operable lever extending above and medially of the spaced vertical supports for actuating said shaft and plunger, a curved plate inclosing said gearing, removable, interchangeable dies on the forward ends of the rod and plunger, and a downwardly and outwardly extending, flared chute formed in the base between the end support and the plunger support for directing the kernel and shells to one side when the nut is opened.

In testimony whereof, I affix my signature hereto.

SIDNEY G. SIMONS.